No. 671,684. Patented Apr. 9, 1901.
A. XANDER.
HOUSEHOLD FILTER AND WATER COOLER.
(Application filed Apr. 7, 1900.)
(No Model.)
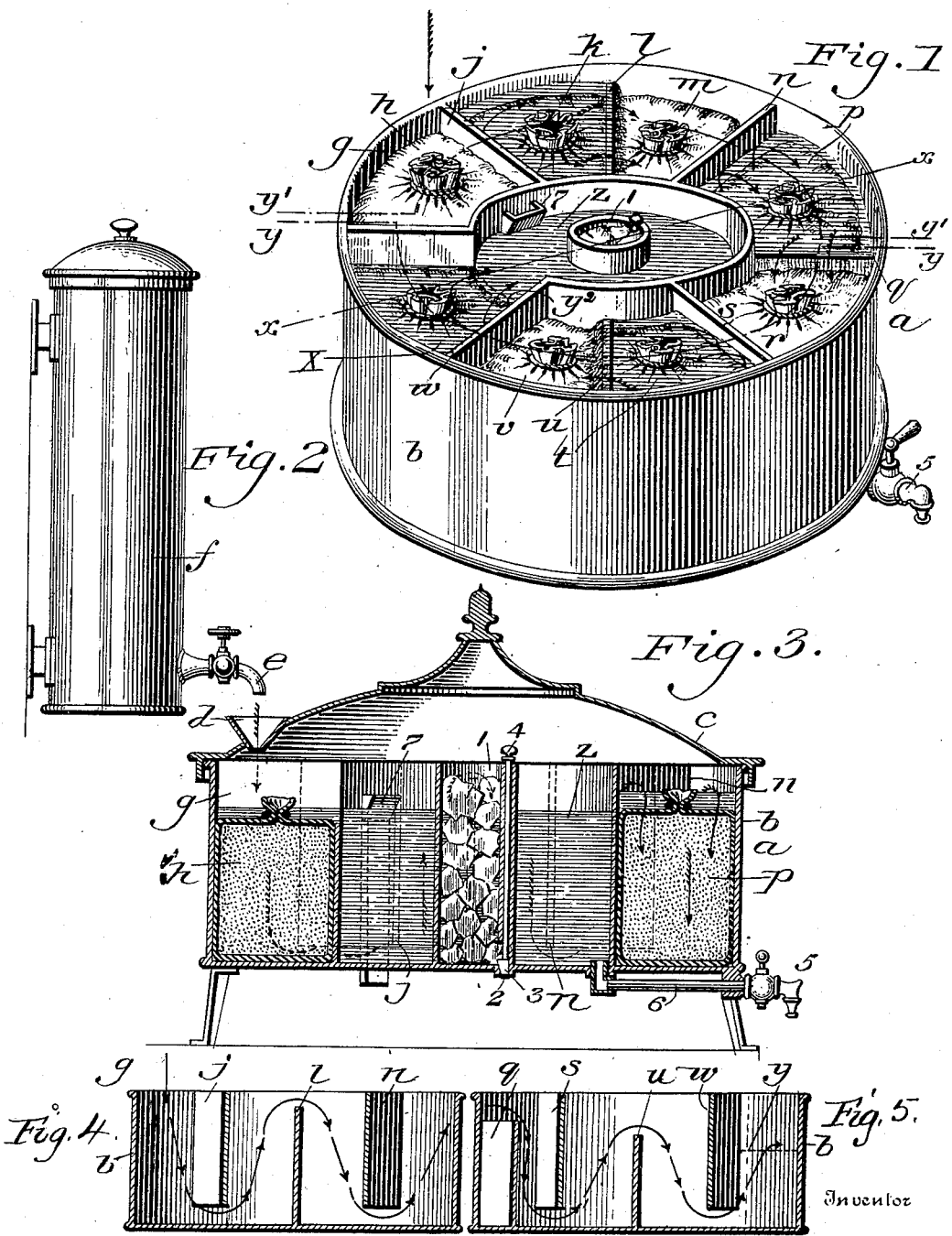

United States Patent Office.

ALLEN XANDER, OF LOCKHAVEN, PENNSYLVANIA, ASSIGNOR OF ONE-HALF TO GEORGE W. SCHULTZ, OF PHILADELPHIA, PENNSYLVANIA.

HOUSEHOLD FILTER AND WATER-COOLER.

SPECIFICATION forming part of Letters Patent No. 671,684, dated April 9, 1901.

Application filed April 7, 1900. Serial No. 11,929. (No model.)

*To all whom it may concern:*

Be it known that I, ALLEN XANDER, a citizen of the United States, residing at Lockhaven, in the county of Clinton, State of Pennsylvania, have invented a new and useful Improvement in Household Filters and Water-Coolers, which improvement is fully set forth in the following specification and accompanying drawings.

My invention consists of a household filter and water-cooler which is divided into compartments or pockets, each pocket being separated from its neighbor by partitions and every alternate partition being open at the bottom, while the intermediate partitions have their tops successively of less height, whereby a side of each succeeding or contiguous pocket from the first has a wall of less height than its neighbor, over which the water in the act of filtration flows.

My invention also consists in placing in each pocket a bag, made of linen, cloth, or other porous material, filled with sand, charcoal, or other suitable filtering substances, said bags being readily removed and washed off according to requirements, and the filtered water, after passing through the various filtering devices, being directed into an interior storage-chamber, in the center of which is an ice-receptacle, whereby the water is filtered and cooled according to requirements.

It further consists of novel details of construction, all as will be hereinafter fully described, and particularly pointed out in the claims.

Figure 1 represents a perspective view of a household filter and water-cooler embodying my invention. Fig. 2 represents a side elevation of a water-tank used in conjunction with said filter. Fig. 3 represents a section on line $xx$, Fig. 1. Fig. 4 represents a diagrammatic section on line $y'y'$, Fig. 1. Fig. 5 represents a diagrammatic section on line $yy$, Fig. 1.

Similar characters of reference indicate corresponding parts in the figures.

Referring to the drawings, $a$ designates a filter, the same consisting of the cylindrical, oval, or similar shaped body or casing $b$, which is provided with the cap or top $c$, having an opening or funnel $d$, through which water is admitted by the spigot $e$ of the tank or reservoir $f$. The unfiltered water passes first into the compartment $g$ and flows downwardly through the bag $h$ and under the partition $j$, thence upwardly through the bag $k$ and over the partition $l$, thence downwardly through the bag $m$ and under the partition $n$, and thence up through the bag $p$ and over the partition $q$. The water now flows down through the bag $r$ and under the partition $s$, up through the bag $t$, over the partition $u$, down through the bag $v$, under the partition $w$, up through the bag $x$, and thence over the partition $y^2$ into the central storage-chamber $z$.

1 designates an inner well or compartment adapted to be filled with cracked ice or other cooling material, the water from the melting ice being withdrawn through the drip or port 2, controlled by the valve 3, which is operated by the valve-rod 4.

5 designates a spigot communicating by the pipe 6 with the inner chamber or compartment $z$, whereby the filtered water can be readily withdrawn according to requirements.

7 designates an overflow in the storage-chamber $z$ for the filtered water.

It will be seen from the foregoing that the unfiltered water entering the compartment $g$ will in its passage through the filter, as hereinabove described, be successively conducted to and through the various filtering devices and finally discharged into the storage-chamber $z$ in a purified condition, wherein it is cooled by reason of the ice contained in the well 1.

The overflow 7 will prevent flooding of the storage-chamber $z$, and as the action of the filter is by gravity it will also be apparent that the water is effectively cleansed from all impurities and articles held in suspension.

It will be apparent that slight changes may be made by those skilled in the art which will come within the scope of my invention, and I do not therefore desire to be limited in every instance to the exact construction I have herein shown and described.

Having thus described my invention, what I claim as new, and desire to secure by Letters Patent, is—

1. In a filter, a plurality of chambers arranged in consecutive order, bags of filtering material located in said chambers, and a series of partitions intermediate said chambers, each alternate partition being of less height and the intermediate partitions being open at the bottom.

2. In a filter, a plurality of compartments, arranged in annular order, said compartments being separated by partitions, every alternate partition being of decreasing height, removable bags of filtering material located in said compartments, a storage-chamber located in the interior of the filter and cooling devices located in said storage-chamber.

3. In a filter, a plurality of compartments arranged in annular order, removable bags containing filtering material located in said compartments, partitions dividing said compartments, each alternate partition being of less height, and the intermediate partitions being open at the bottom, a storage-reservoir located within said compartment, and a cooling device for said storage-chamber.

4. In a filter, a series of communicating compartments arranged in annular order, said compartments being separated by partitions, each alternate partition being open at its bottom and the intermediate partitions being of reduced height, a central storage-chamber, a cooling well or chamber, and means for withdrawing the filtered and cooled water from said storage-chamber.

5. In a filter, a series of communicating compartments arranged in annular order, said compartments being separated by partitions, each alternate partition being open at its bottom and the intermediate partitions being of reduced height, a central storage-chamber, a cooling well or chamber, and means for withdrawing the filtered and cooled water from said storage-chamber, in combination with an overflow for said storage-chamber, and a drip for said cooling-chamber.

6. In a filter, a plurality of chambers arranged in annular order and partitions intermediate said chambers; each alternate partition being of decreasing height and the intermediate partitions being open at the bottom.

7. In a filter, a plurality of chambers arranged in annular order and partitions intermediate said chambers, each alternate partition being of decreasing height and the intermediate partitions being open at the bottom, in combination with a central cooling device into which the filtered water is conducted.

8. In a filter, a plurality of chambers arranged in consecutive order, partitions intermediate said chambers, each alternate partition being of decreasing height and the intermediate partitions being open at the bottom, and filtering material in said chambers.

9. A filter composed of chambers having partitions therebetween, the alternate partitions being of decreasing height and the intermediate partitions open at the bottom and filtering material in said chambers.

ALLEN XANDER.

Witnesses:
GEO. A. BROWN,
KATHRYN FUREY.